United States Patent
Snelgrove

(10) Patent No.: US 6,535,592 B1
(45) Date of Patent: Mar. 18, 2003

(54) ESTABLISHING AND MANAGING COMMUNICATIONS OVER TELECOMMUNICATION NETWORKS

(75) Inventor: William M. Snelgrove, Toronto (CA)

(73) Assignee: Soma Networks, Inc.

(*) Notice: Subject to any disclaimer, the term of this patent is extended or adjusted under 35 U.S.C. 154(b) by 0 days.

(21) Appl. No.: 09/722,003

(22) Filed: Nov. 27, 2000

(30) Foreign Application Priority Data

Mar. 23, 2000 (CA) .............................................. 2303000

(51) Int. Cl.⁷ ............................................. H04M 15/00
(52) U.S. Cl. .............................. 379/114.07; 379/114.06; 379/114.1; 379/114.11; 379/114.12
(58) Field of Search .................... 379/112.1, 114.06, 379/114.07, 114.1, 114.11, 114.12

(56) References Cited

U.S. PATENT DOCUMENTS

| | | | |
|---|---|---|---|
| 4,399,531 A | 8/1983 | Grande et al. | 370/216 |
| 4,933,936 A | 6/1990 | Rasmussen et al. | 370/406 |
| 4,939,773 A | 7/1990 | Katz | 379/204 |
| 4,974,256 A | 11/1990 | Cyr et al. | 379/113 |
| 5,473,363 A | 12/1995 | Ng et al. | 348/15 |
| 5,517,562 A | 5/1996 | McConnell | 379/207 |
| 5,581,610 A | 12/1996 | Hooshiari | 379/133 |
| 5,596,635 A | 1/1997 | Rao | 379/202 |
| 5,603,054 A | 2/1997 | Theimer et al. | 395/826 |
| 5,638,412 A | 6/1997 | Blakeney, II et al. | 375/377 |
| 5,668,854 A | 9/1997 | Minakami et al. | 379/88.18 |
| 5,674,003 A | 10/1997 | Anderson et al. | 709/228 |
| 5,710,807 A * | 1/1998 | Smith | |
| 5,742,772 A | 4/1998 | Sreenan | 396/200.56 |
| 5,754,636 A | 5/1998 | Bayless et al. | 379/142 |

(List continued on next page.)

FOREIGN PATENT DOCUMENTS

| EP | 0 448 073 A2 | 9/1991 | H04L/12/56 |
| EP | 0620699 A1 | 10/1994 | H04M/3/46 |
| EP | 0 680 190 A2 | 11/1995 | H04M/3/56 |
| EP | 0716386 | 6/1996 | G06F/17/60 |
| EP | 0 859 500 A2 | 8/1998 | H04M/3/50 |

(List continued on next page.)

OTHER PUBLICATIONS

"Connection Establishment in High–Speed Networks", Scott Jordan and Hong Jiang, IEEE Journal on Selected Areas in Communications, vol. 13, No. 7, Sep. 1995.

(List continued on next page.)

Primary Examiner—Curtis Kuntz
Assistant Examiner—Barry W Taylor
(74) Attorney, Agent, or Firm—Katten Muchin Zavis Rosenman

(57) ABSTRACT

A telecommunication system and method for communicating between at least two end users over a telecommunication network, where the communication is defined by a set of parameters. At least two entities, such as one or both of the end users and/or the service providers negotiate an agreed set of values for said parameters that define the desired communication. The entities also negotiate a warranty agreement with the network service provider defining at least one of the agreed parameters to be warranted including a compensation method to be applied should said at least one monitored parameter fail to meet the corresponding one of said agreed values. The agreed warranted parameters are monitored once the communication is established and, in the event of a failure of the monitored parameters to meet agreed values, at least one of the entities is compensated in accordance with the agreed compensation method. When more than two entities are involved in a communication, the compensation from an entity can be divided amongst the other entities according to an agreed scheme.

18 Claims, 4 Drawing Sheets

U.S. PATENT DOCUMENTS

| | | | |
|---|---|---|---|
| 5,774,674 A | 6/1998 | Gutmann et al. | 709/237 |
| 5,793,762 A | 8/1998 | Penners et al. | 370/389 |
| 5,859,979 A | 1/1999 | Tung et al. | 709/228 |
| 5,898,772 A | 4/1999 | Connors et al. | 379/265 |
| 5,926,798 A | 7/1999 | Carter | 705/26 |
| 5,999,563 A | 12/1999 | Polley et al. | 375/222 |
| 6,009,154 A * | 12/1999 | Rieken et al. | 379/114.1 |
| 6,021,158 A | 2/2000 | Schurr et al. | 375/211 |
| 6,134,306 A * | 10/2000 | Lautenschlager et al. | 379/114.12 |
| 6,243,450 B1 * | 6/2001 | Jansen et al. | |

FOREIGN PATENT DOCUMENTS

| | | | | |
|---|---|---|---|---|
| WO | WO 97/26750 | 7/1997 | | H04M/11/00 |
| WO | WO 97/35402 | 9/1997 | | H04L/9/00 |
| WO | WO 97/36430 | 10/1997 | | H04Q/3/00 |
| WO | WO 98/19412 | 5/1998 | | H04J/3/16 |
| WO | WO 98/21871 | 5/1998 | | H04M/3/42 |
| WO | WO 98/37688 | 8/1998 | | H04M/3/42 |
| WO | WO 00/19663 | 4/2000 | | H04L/12/24 |
| WO | WO 00/19677 | 4/2000 | | H04L/29/00 |
| WO | WO 00/19691 | 4/2000 | | H04M/3/50 |
| WO | WO 00/19693 | 4/2000 | | H04M/3/56 |
| WO | WO 00/19735 | 4/2000 | | H04Q/3/00 |
| WO | WO 00/19736 | 4/2000 | | H04Q/3/00 |

OTHER PUBLICATIONS

"New Lucent software allows Internet telephony providers to offer ubiquitous, seamless telephone service", Lucent Technologies, http://www.lucent.com/press/0998/980917.bla.html, Sep. 17, 1998.

"Lucent Technologies unveils next–generation IP business systems that converge voice and data over local and wide area networks", Lucent Technologies, http://www.lucent.com/press/1098/9810221.bca.html, Oct. 21, 1998.

"Vendors Raise Voice Over IP", Chuck Moozakis, http://www.internetwk.com/news1098/news102398-3.htm, Oct. 23, 1998.

"An Insurgence of Convergence At N+1", Kim Borg.http://www.westworldproductions.com/archive/1998/1198ctr/5897.htm, Nov. 1998.

* cited by examiner

ESTABLISHING AND MANAGING COMMUNICATIONS OVER TELECOMMUNICATION NETWORKS

The present invention relates generally to telecommunications, and more specifically, to a method and system of establishing and managing telecommunications over telecommunication networks by providing and enforcing a warranty for communications failing to meet parameters agreed to by the entities involved in the communication.

BACKGROUND OF THE INVENTION

For many decades, telecommunication networks were designed to carry human voices and some data signals, such as Morse Code, in audio bands. However, in the last few decades, telecommunications have been moving into higher bandwidths, using digital signals in order to increase the capacity of physical infrastructures and reducing the cost of supplying telecommunication services. While a copper wire pair in a traditional telephone system carried a single analog voice signal, dozens of voice signals can now be digitized, multiplexed, and transmitted at higher frequencies over the same copper wire pair.

Telecommunication Service Providers now use various transmission means including analog, digital and compressed digital methods, over a variety of media, including hard wire, wireless, fiber optic and satellite transmission means. Data transmission methods and protocols now include Internet Protocol (IP), asynchronous transfer mode (ATM), frame relay, and digital telephony. The networks of these Service Providers are generally interconnected with those of others to form larger, heterogeneous networks.

Currently, two networks dominate telecommunications: conventional telephone networks (public switched telephone networks or PSTNs) with their almost universal physical infrastructure; and the Internet, which has grown tremendously over the last decade and continues to grow.

Telecommunication systems, such as those for telephony and the Internet, are composed of terminal equipment such as telephones or personal computers; an access network such as a telephony local loop or a radio link, switches or routers; and a backbone network such as the PSTN or an intercity data network. One design challenge is that the needs of users at the terminals are very varied, but the backbone networks must handle highly standardized loads in order to operate reliably and efficiently.

FIG. 1 is an example of a prior art telephony system 10. System 10 includes a plurality of switches 12 controlled by large computer programs in switch controllers 14. Switches 12 are interconnected with one another by trunks 16 which carry the actual communication signals and can consist of a variety of physical media, such as optical fiber and coaxial cables. Switch controllers 14 are also interconnected, generally by means of signaling lines 18 rather than over communication trunks 16.

Telephony systems 10 also generally include computing means to implement such features as conference calling 20, voice mail 22 and toll services 24. Telephony features, such as call forwarding, may be implemented by adding code to the programs running the switches 12 or by adding specialized hardware to the telephony system 10. The features available to particular users are defined in databases accessed by software on switch 12, and adding a new type of feature may involve changing these databases together with the software on each switch 12 that uses them, and may also involve purchasing and installing new types of hardware in the system.

FIG. 2 is an example of a prior art Internet communications system 30. The Internet 32 itself is represented by a number of routers 34 interconnected by an Internet backbone 36 network designed for high-speed transport of large amounts of data. User's computers 38 may access the Internet in a number of manners including modulating and demodulating data over a telephone line using audio frequencies. Such dial up access requires a modem 40 and connection to the Public Switched Telephone Network 42, which in turn connects to the Internet 32 via a point of presence 44 including a complementary modem 40 and an access controller 46. Another manner of access is the use of broadband modems 50 which modulate and demodulate data onto high frequencies which pass over CATV networks 52, or the like, which are connected to the Internet via a controller 54.

Part of the access network in these systems is usually a set of computer systems 39 at the edge of the backbone network 36 which perform functions such as authentication of users and control of the load that they place on the backbone network 36. Communications between users' computers 38 and the rest of the network 30 are standardized by means of defined communication protocols.

Communications over the Internet can be accomplished via various protocols and over a variety of physical transfer media. A protocol is a set of conventions or rules that govern transfer of data between hardware devices. The simplest protocols define only a hardware configuration while more complex protocols define timing, data formats, packet construction and interpretation, error detection and correction techniques and software structures.

The Internet is a connectionless network service, in that a single communication may be broken up into a multitude of data packets that follow different paths between the same source and destination. Traditional telephony, in contrast, reserves resources to establish a single dedicated path for a communication that all of the data in the communication follows.

The Internet employs the Internet Protocol (IP) and the key advantages of IP are that it allows a large network to function robustly and that it offers a standardized means by which applications software can use that network. While it offers a number of advantages, actual performance is based on performance levels which are not consistent or absolutely guaranteed and which can, at best, only be statistically estimated.

Networks for telephony and data transmission have developed separately, but the economic rationale for having distinct physical networks is disappearing and the technologies are converging. They appear to be converging on a model closer to that for data than that for telephony, partly because of the greater generality of data networks. The dominant data network is currently the Internet but there is a fundamental difference between these two networks. Conventional telephone systems generally take a "first-come-first-served" approach when there is contention for network resources, denying services to subsequent callers if sufficient resources are not available and this process is known as "call admission". The Internet however, is packet based and has traditionally offered "best effort" service without making any attempt to prioritize traffic. That is, the Internet will accept all traffic, and the flow-through rate will vary with the demands the parties place on the resources available. This difference in operating philosophy makes it difficult to offer traditional services over a converging network.

As well, because the requirements for voice and data transmission can be quite different, it is difficult to optimize for provision of both on a common network. Voice communication, for example, produces a relatively steady stream of data at a relatively low data rate, and rapid delivery is more important than accuracy (i.e. a low end to end latency is more important than a small percentage of dropped packets). In contrast, data applications such as Web browsing or ftp file transfers generally produce bursts of data that are required to be delivered accurately, but for which an end to end latency of a second or two or more may be considered acceptable.

This problem is aggravated by the demand for new services such as video telephony, Internet games, video on demand, Internet audio, streaming audio or video, remote collaborative work or telemedicine, which require differing levels of quality and degrees of bandwidth. Clearly, the network must be able to allocate and control the quality and quantity of bandwidth in order to use its resources efficiently and to meet the needs of its users.

For example, telemedicine surgery in which a physician uses a remote manipulator to perform surgery could likely not be implemented with the existing Internet. This application would require very strict demands on both accuracy and timeliness together with a high bandwidth for video. The consequences of the network failing to perform as required would be very serious.

A contrasting example is multiplayer gaming, in which a number of players exchange small packets of information to update each other on their moves and present state. Given how such games are typically implemented, this can require low latencies, but bandwidth requirements are light and a fairly high rate of packet loss can be tolerated.

Existing networks are not designed to provide such diverse services and performance requirements.

While the Internet provides an efficient network for transporting data packets, it is not designed to provide end to end services with guaranteed performance levels. Typically, there is a static selection of services available to users, under predetermined terms and conditions. The performance level that a user may expect is offered on a "best effort" basis and is not firmly guaranteed.

The Internet has attempted to provide guaranteed quality of service (QoS) by use of the resource reservation protocol (RSVP). RSVP is an extension to IP that permits specification of quality of service at a technical level, in terms of parameters such as data rates and latencies by reserving network resources to establish a 'virtual connection' with the required QoS. It has had limited acceptance due to the complexity it adds to backbone networks and the need for their switching hardware to be updated, and it fails to include mechanisms to specify the costs associated with the QoS demands that it makes. More significantly, RSVP ensures quality of service by reserving resources, a strategy which lacks the efficiencies of the best-effort networks as it can result in the reserved resources being idle at various times.

Asynchronous Transfer Mode (ATM) networks use standard protocols for addressing packets of data (as does IP), setting up connections (as does TCP), and specifying QoS (as does RSVP). ATM networks have typically been deployed in the core of backbone networks because of the high speeds at which ATM equipment operates, but ATM capabilities have not been directly visible to end users (because of the dominance of IP as an applications standard and the high costs of ATM equipment). Because ATM routers are not directly accessible and because of the complexity of their mechanisms for describing QoS, these mechanisms have not been used by applications software. Further, reservation systems such as ATM or RSVP only deal with network capacity and can still fail to meet performance requirements due to equipment failures, etc. Also, as was the case with RSVP, these QoS mechanisms do not include methods by which to describe the costs associated with a QoS demand.

Therefore, there is currently no efficient way to offer or guarantee QoS over the Internet, other packet networks, or other best-effort networks and, even with call admission networks, there is no effective manner for dealing with missed performance levels. In general, all telecommunication links are error prone, to some level. Service providers can profit by allowing increased error rates and/or latencies and will be tempted to do so. However, users generally have no mechanism to determine when such degradations occur and no mechanism allowing them to be compensated even if they determine such degradations are occurring.

Scott Jordan and Hong Jiang survey a number of models, in which the network offers a rate schedule from which the calling party selects their preference, in "Connection Establishment in High-Speed Networks", IEEE Journal on Selected Areas in Communications, vol. 13, no. 7, September 1995. Nagao Ogino presents a similar methodology, in which a number of service providers bid on the provision of communication services, in "Connection Establishment Protocol Based on Mutual Selection by Users and Network Providers", ACM, 1998. In both cases though, there is no discussion or consideration of how users can ensure they will obtain the performance that they paid for or how they might be compensated if they do not obtain the performance agreed with the service provider.

Users of the existing PSTN are used to very predictable quality and reliability referred to as "four 9's" reliability. That is, successful performance of a voice quality communication can be expected in 9,999 out of 10,000 calls, once a connection is obtained. To date, such reliability cannot be obtained on packet or other networks, but the much lower cost of Internet Protocol based services and increased diversity will force the PSTN to incorporate those protocols in order to compete. Clearly, some means of addressing this problem is required.

The connectionless telecommunication networks known in the art do not offer guaranteed service levels. Further, there does not exist any mechanism for warrantying communication parameters to users over connectionless, call admission or other telecommunication networks. There is therefore a need for a method and system of providing telecommunication services over connectionless and other telecommunication networks, which improves upon the problems known in the art. This design must be provided with consideration for ease of implementation and recognize the pervasiveness of existing telecommunication infrastructures.

SUMMARY OF THE INVENTION

It is therefore an object of the present invention to provide a method and system for establishing and managing communications over telecommunication networks which obviates or mitigates at least one of the disadvantages of the prior art.

According to a first aspect of the present invention, there is provided a method of communication between at least first and second entities over a telecommunication network, where said communication is defined by a set of parameters, said method comprising the steps of:

(i) negotiating between said at least first and second entities an agreed set of values for said parameters that define the desired communication;

(ii) negotiating a warranty agreement between said at least first and second entities defining at least one of said agreed parameters to be monitored and a compensation method to be applied should said at least one monitored parameter fail to meet the corresponding one of said agreed values;

(iii) establishing said communication;

(iv) monitoring said at least one parameter of said communication; and (v) in the event of a failure of said monitored parameter to meet said agreed value, compensating at least one of said first and second entities in accordance with said negotiated compensation method.

According to another aspect of the present invention, there is provided a telecommunications system comprising:

a first end user;

a second end user;

a telecommunications network interconnecting said first end user said second end user and having at least one transmission link and protocol;

said first end user and said telecommunication network negotiating a communication between said first end user and said second end user; and said first end user and said telecommunication network being operable to:

(a) agree on values for a set of parameters defining a communication between said first end user and said second end user; and (b) agree on a warranty agreement defining at least one of said set of parameters to be monitored and a compensation method to be applied should said at least one monitored parameter fail to meet the corresponding one of said agreed values.

In the present invention, communications between at least two end users are achieved over at least one telecommunications link. Preferably, the communication is defined by a set of parameters, usually including one or more network performance parameters and/or QoS parameters, which are negotiated by, or on behalf of, at least one of the end users with the one or more network service providers who will establish the communication. A successful negotiation results in an agreed set of values for the parameters and a warranty agreement with the network service provider that defines at least one of the agreed parameter values to be warranted. The warranty agreement also defines a compensation method to be applied should a measured value of the parameter fail to meet the corresponding agreed value.

Once the communication is established, the agreed warranted parameter, or parameters, are monitored and, in the event of a failure of a monitored parameter to meet the agreed values, the compensation method is invoked and at least one user or other entity involved in the communication is compensated in accordance with the compensation method. If multiple users are involved in a communication, the compensation can be divided amongst them according to an agreed scheme. Similarly, if multiple network service providers are involved in the communication with the users and/or in establishing point to point links in the communication, the network service provider who fails to meet agreed parameters can compensate other network service providers and/or users, as appropriate. Compensation can be achieved in a variety of manners, including by monetary means, including reduced billings, refunds and/or penalty payments, or by the provision of free or reduced rate communications, either for the present communication or for a future communication.

The telecommunication network can be a call admission network, a connectionless network, a virtual connection network or any combination of these networks. In the case of call admission networks, the negotiation of values for communication parameters can be trivial, but a warranty can still be agreed and provided.

BRIEF DESCRIPTION OF THE DRAWINGS

Embodiments of the present invention will now be described, by way of example only, with reference to the attached Figures, wherein.

DESCRIPTION OF THE INVENTION

Figure 1:
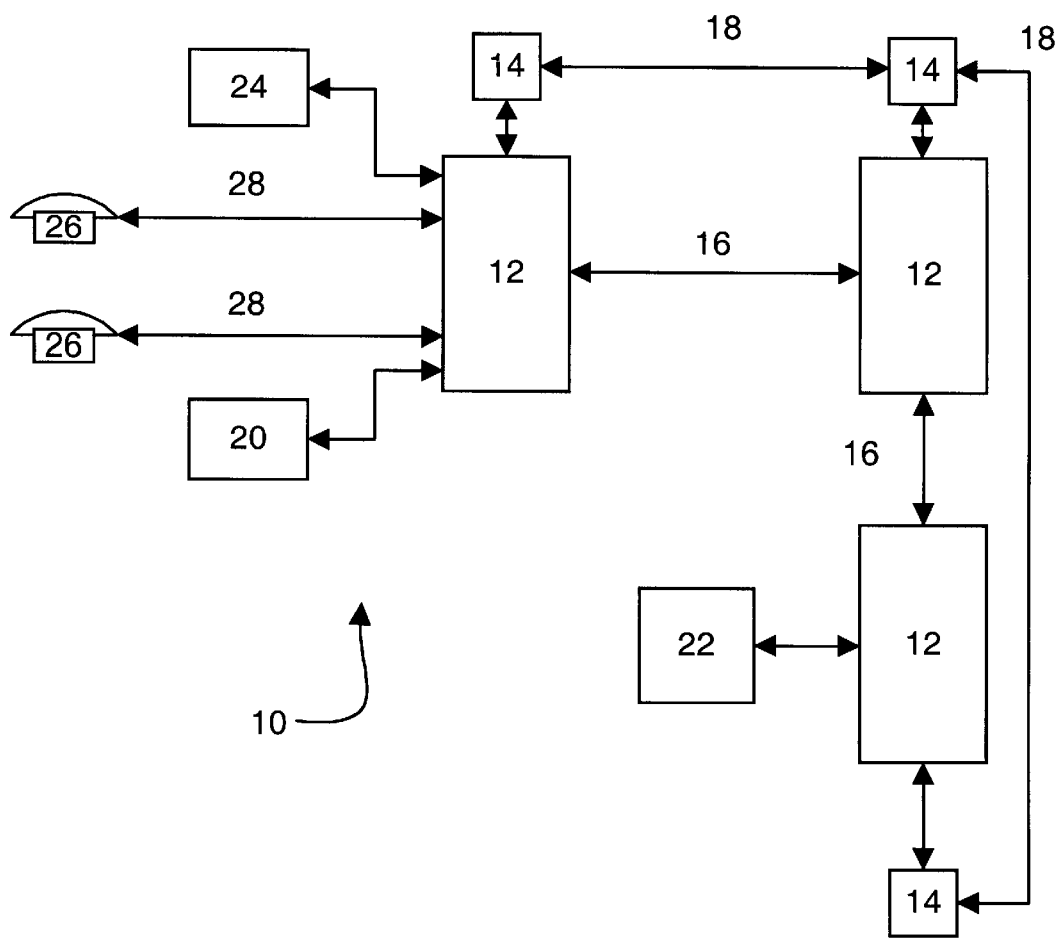
FIG. 1 shows a block diagram of a prior art public switched telephone network (PSTN)
Figure 2:
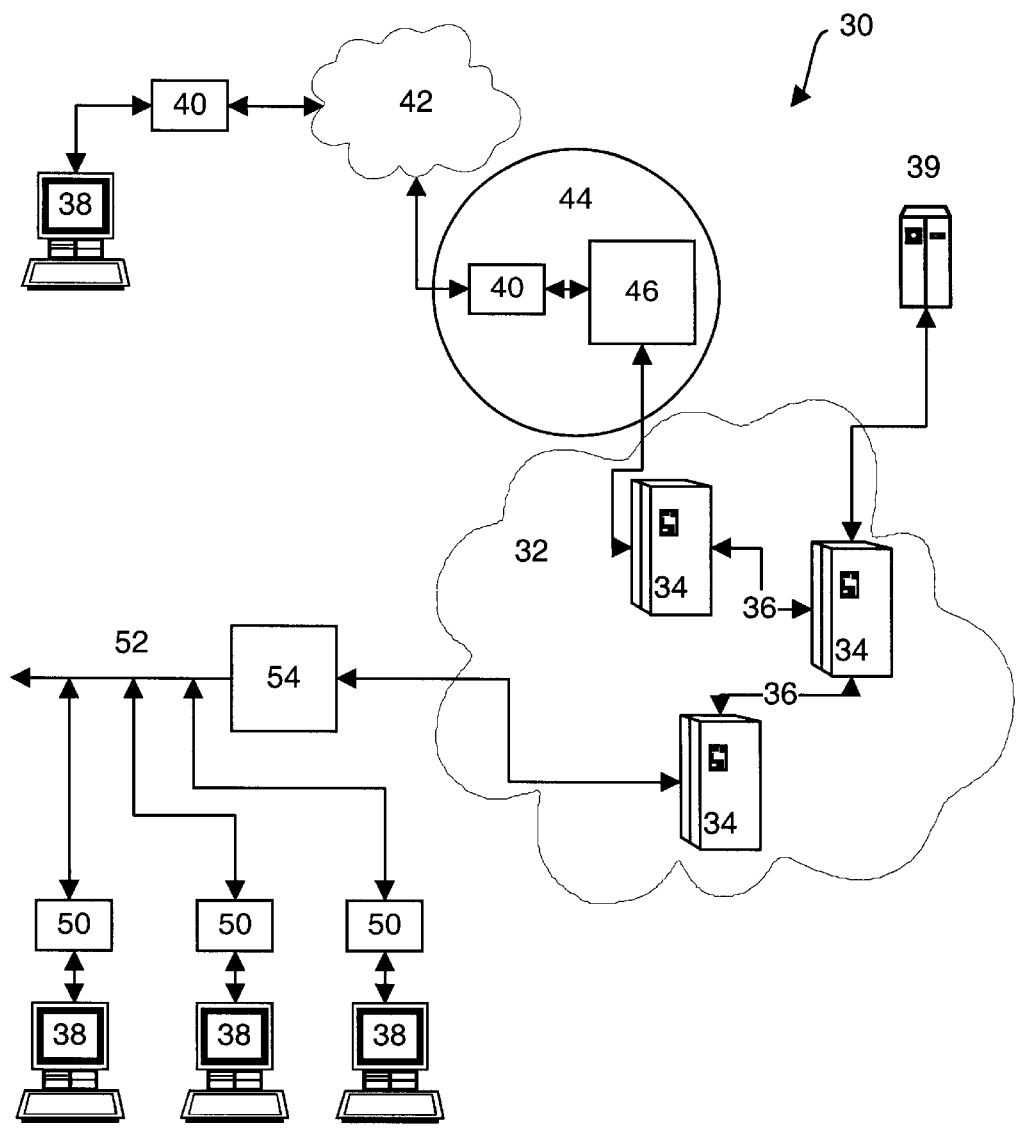
FIG. 2 shows a block diagram of a prior art Internet network.
Figure 3:
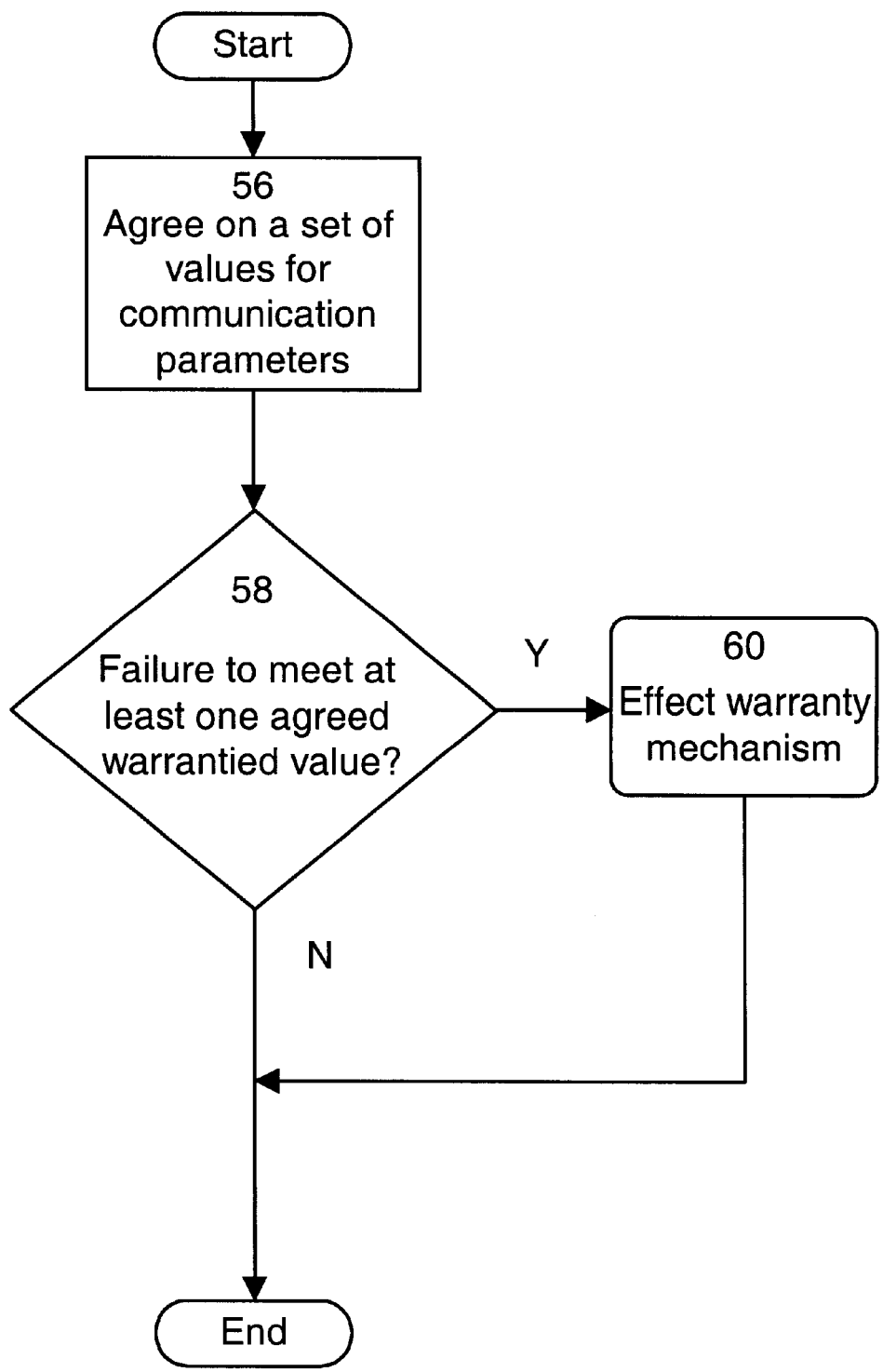
FIG. 3 is a generalized flow chart of the method employed in a warranty mechanism in accordance with the present invention.

FIG. 3 shows a high level view of the implementation of a methodology in accordance with the present invention. This Figure presents a method of communication between a first entity (a first end user) and a second entity (a second end user) over a telecommunication network, operated by a single network entity, to which the end users are connected and where the communication is defined by a set of agreed values for communication parameters agreed by the entities. In this example, the second end user is passive, as the communication recipient, and the first entity and the network entity agree on the set of values for the parameters at step 56. The entities also agree which, if any, of those values are warranted. As described below, the parameters are any suitable set of parameters and, for example, can include a minimum data rate, a maximum latency, a maximum frame error rate, etc. If one of the agreed values for those parameters is not met during the execution of the communication at step 58, and if that parameter or parameters are warranted, then the system responds by triggering a warranty mechanism at step 60.

The phrase "entity" is used herein to describe hardware or software that represents any party having an interest in the parameters for the communication. Such parties can include end users, their service providers, interconnecting (point to point link) service providers, etc. End users, for example, will have terminal devices which allow the end user to communicate audio, video, data or other similar information with other users, and such terminal devices can include telephones, personal computers, personal digital assistants, cellular telephones, pagers, fax machines or other devices as known in the art. Such user terminal devices are referred to herein as user interfaces. Service providers can, for example, communicate with the end users via dial-up, cable or wireless modems, or using technologies such as ISDN (integrated services digital network), xDSL (digital subscriber line), ATM (asynchronous transfer mode) and frame relay and can communicate with each other through any suitable interconnection between their networks.

The present invention is not limited to use with communications involving only two end users and a network entity and communications can be established wherein multiple service providers are engaged to provide necessary links. Also, multi-user services such as conference calls and streaming video will necessarily involve multiple entities even in circumstances wherein a single service provider is involved. While in the example of FIG. 3 only a first entity (first user) and a second entity (network service provider) are involved in negotiations it is also contemplated that multiple entities can be involved in negotiations including the second and/or additional end users and each service provider.

The parameters that define the communication will depend on the nature of the communication that is desired. In the simple case of a voice call, the parameters can include: the price and its basis (i.e.—how much per packet or per minute, etc.), an identification of who pays, and performance and/or QoS parameters such as the maximum latency that will be tolerated and the required voice sampling quality.

As explained above, there are currently two main telecommunications networks, the public switched telephone network (PSTN) and the Internet, but economics and competition are forcing these to converge into a single data network. The protocols which use the network resources most efficiently are "best-effort", or connectionless, protocols which accept all traffic, and vary the flow-through rate with the demands placed on the resources available. Because there is an inherent failure rate and variable performance for such networks, the expected performance is not consistent nor can it be absolutely guaranteed, though performance can be statistically estimated.

By providing a warranty for the agreed terms of the communication, the agreement between entities receives credibility and efforts to achieve the agreed terms are in the best interest of all entities. Entities can control the degree of confidence they can expect in the agreement by controlling the terms of the warranty. Negotiating a communication with strict warranty terms and/or onerous penalties will typically afford the communication a higher priority on a service provider's network.

As explained above, there is a growing demand for diverse services, which require telecommunication service providers to allow service parameters to be tailored to the specific requirements of the users. As the prevailing networks are "best-effort", there is no guarantee a communication will perform as agreed. Some way is therefore required to enforce the terms of the agreement, which the present invention accomplishes by providing and enforcing a warranty mechanism.

In the past, when an end user agreed to a communication, he could receive lower quality than he agreed to pay for because of failures and statistical variability. The present invention controls the tradeoff of cost to quality by controlling what is paid for the quality that is actually received. This is accomplished by compensating the appropriate entities when the agreed performance is not met, through the warranty mechanism.

The present invention also allows new services, or types of Quality of Service, to be provided via a communication network. For example, a network service supplier can sell a quality of service to its end users which warrantees that they will not receive annoying calls, such as telemarketing, etc. In such a case, the network service supplier can enforce a warranty parameter whereby any of its end users can activate an "annoying call" identifier when they receive a communication that they did not wish to receive and the originator of such a call will be forced to pay a penalty to the offended end user. A user receiving a telemarketing call can effect the warranty mechanism by any suitable means, such as pressing a Flash and a dial pad number during or after the call. In effect, the call originators are warrantying that their calls will not offend end users. Similarly, a telemarketer or other caller can pay a network service supplier to contact a user on a person to person basis and the warranty mechanism can be invoked when an answering machine is reached instead. The warranty mechanism can, in this case, refund a portion of the price paid for the connection as it was not person to person. Other new and unique services can be provided in a similar manner, as will be more readily apparent after reading the rest of the disclosure below.

Figure 4:
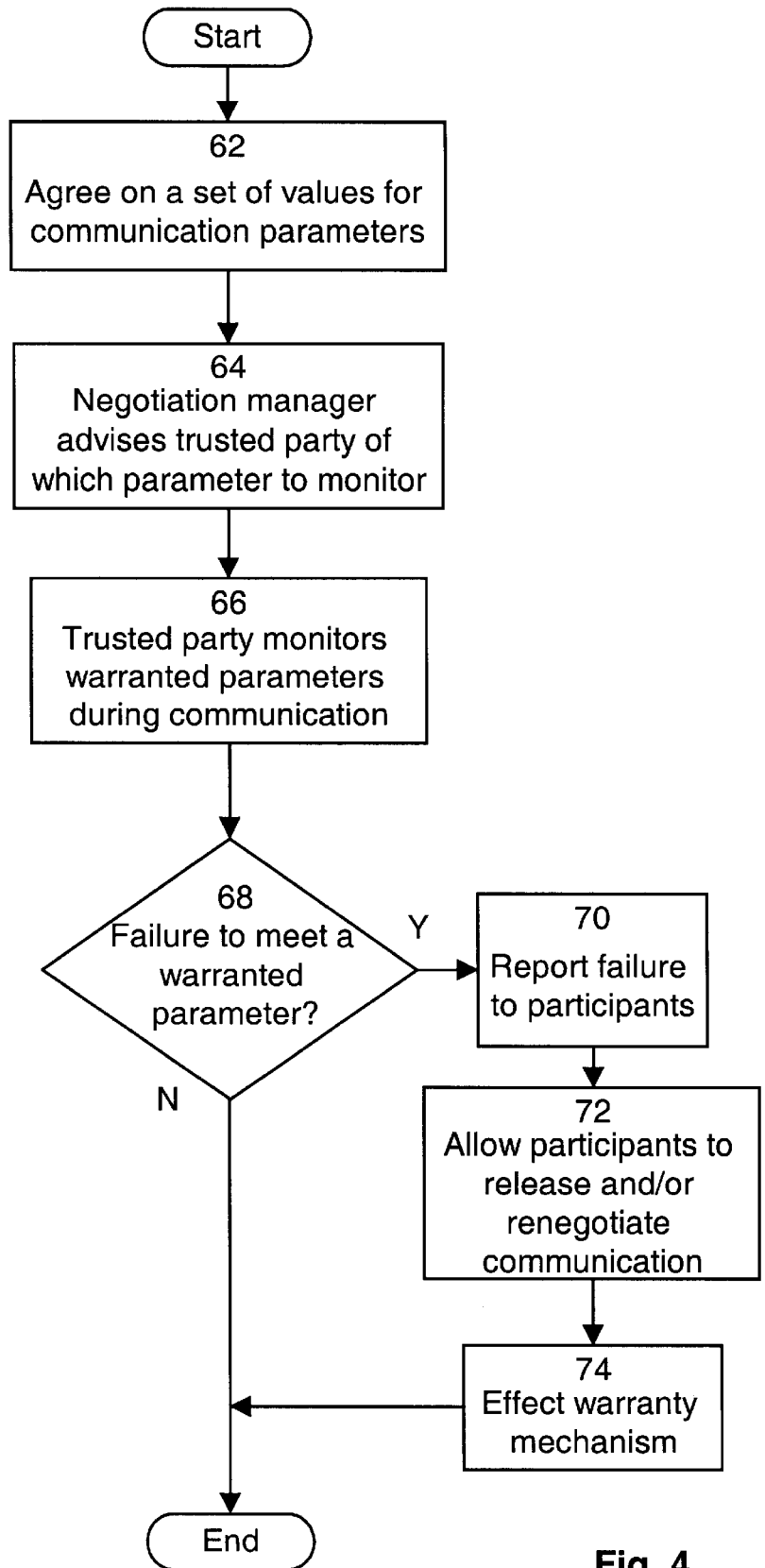
FIG. 4 is a flow chart of a warranty mechanism for communications in an embodiment of the invention.

FIG. 4 shows a more detailed flow chart of a method in accordance with the present invention. The process begins at step 62 where the negotiating entities agree on a set of values for the parameters defining the communication they wish to establish. The negotiation can be a simple matter of a communication service provider having a standard set of offerings, from which the calling party makes a selection or can be a multi-entity, multi-round negotiation wherein service providers, service levels, pricing and warranty terms must be agreed. In either case, the negotiation is administered by a negotiation manager or other suitable mechanism agreed to by the entities.

The negotiation manager can be any suitable mechanism which allows the entities to identify and agree to a set of parameters and values. In a presently preferred embodiment, the negotiation manager is a software application executing on at least one computing device connected to the participating entities, directly or indirectly. Ideally, the negotiation manager is operated and maintained by a trusted party which ensures that fair negotiations occur.

The negotiated parameters can include: minimum sustained data rates, maximum burst rates and durations, duty cycles, maximum acceptable frame error rates, maximum acceptable end to end latencies, etc. This negotiation would also include the terms of the warranty agreement, including an identification of which parameters are to be warranted and a definition of the consequences of a failure to meet the warranted performance.

Warranted parameters can be agreed in a variety of flexible manners, including conditional, graduated or absolute parameters. A conditional parameter is a parameter which is dependent upon the value of another parameter, such as a frame error rate that can depend on, and/or vary with, a warranted data rate with the permitted number of errors increasing as the data rate increases and vice versa. A graduated parameter is a parameter with different behaviors at different levels. For example, a data rate which is warranted to provide continuous transfer rates of five hundred kilobits per second (kps) can have an agreed monetary warranty mechanism of a tenth of a cent refund for each packet transmitted at less than the agreed five hundred kps rate and more than a three hundred and fifty kps rate and a full cent refund for each packet transmitted at a rate less than three hundred and fifty kps. An absolute parameter is a parameter whose condition is either met or not, for example end to end latency can be warranted to not exceed one hundred milliseconds and if this limit is exceeded, then the warranty mechanism is invoked.

In order to negotiate such an agreement, a communication provider can assess their risk in agreeing to the terms of the warranty. The simplest business model is:

Profit=negotiated rate−cost of service−cost of warranty

That is, for a given service with a fixed cost and fixed profit target, there is a tradeoff of the negotiated rate against the cost of the warranty. Therefore, a simple view of the rate to charge is:

Charge out rate≧desired profit+cost of service+(P×warranty cost)

where P is the probability (between zero and one) that the proposed value for the specified parameter or parameters will not be met. Because errors and failures can be modeled and estimated statistically, a "bet" or tradeoff between the warranty cost and charge out rate can be created. Probability P can be calculated based on historic data, for the case of failures, and expected loading of the resources and can be influenced by the amount of risk the service provider is willing to accept versus the amount of redundant (unused) capacity he has in his network, etc. As the communication service provider has some degree of control over the loading, the expected results can be very predictable. The communication service provider does not have control over bursts and the like, but can negotiate the parameters associated with bursty data to limit their exposure to an acceptable level for the charge out rate. More complex formulas for determining the Charge Out Rate can be employed, for example taking other factors such as total amounts paid by a user, the desirability of providing services to the user, the present state of the provider's network, the time of day, etc., into consideration It is also important to note that different telecommunication models or paradigms will have different cost curves and break even points. More complex methods can be employed, including starting with calculated statistics which are modified as additional network usage data is collected. The calculation of such curves is well within the ability of those skilled in the art.

At step 64, once the terms of the agreement have been negotiated, the negotiation manager advises a trusted party of the terms of the agreement, which parameters to monitor, and how to effect the warranty. In a simple application, where the calling party pays for a communication, the "trusted party" can simply be a software function that the network service provider has created and which the calling party intrinsically trusts. In more complex applications, an independent software agent, or other suitable mechanism, can be used with, for example, each participant confirming their trust through a suitable method, such as by submitting a non-revocable password.

At step 66, the trusted party establishes a mechanism to monitor the agreed parameter or parameters to which the warranty applies while the communication proceeds. As noted above, the most likely parameters to monitor are performance parameters such as latency and bit or frame error rates, although other parameters, including end user satisfaction parameters (such as the "annoying call" parameter discussed briefly above) can also be monitored.

Latency is the amount of time a data packet requires to travel from a transmitting entity to a receiving entity. In the case of communications through multiple links, the measure most often of interest is the end to end latency, which is the total time a packet requires to travel from the originating entity to the final destination entity, i.e.—the sum of the latency on all links in the communication. In voice communications, the maximum end to end latency that is generally found acceptable is about 200 milliseconds, though in the case of the present invention, different acceptable maximum latencies for voice communication can, of course, be negotiated. For data communications, a much wider range of latencies may be of interest, depending upon the nature and use of the data. Latency can be monitored, or estimated, in a number of ways such as time stamping of packets, etc. as will be apparent to those of skill in the art.

Another parameter for which warranties likely will often be desired is the bit error rate (BER) or, more commonly, the frame error rate (FER). Again, suitable methods of detecting BERs or FERs are well known to those of skill in the art and acceptable ranges of BERs and/or FERs will again differ depending upon the nature and use of the data.

The mechanism to monitor agreed parameters will depend upon which parameters are to be monitored, but establishment of such suitable mechanisms is within the normal skill of those skilled in the art.

At step 68, for the duration of the communication or warranty period (whichever is less), the trusted party monitors whether the performance of the communication meets the terms of the warranty agreement. If no exceptions to the warranty terms (failures) are encountered during the warranty period (which can be a time, a number of packets, the duration of the communication, etc. as specified in the negotiated terms), the process continues until expiry of the warranty period. If the warranty is not fulfilled (i.e.—a failure has occurred), control passes to steps 70, 72 and 74.

At step 70, the trusted party advises the entities as to what performance parameter, or parameters, was not satisfied and what the ramifications of that failure are. At step 72, the trusted party can allows participants the opportunity to release the communication to renegotiate its terms, though the participant responsible for the failure is still bound to honor the agreed warranty. This allows the entities to cancel a communication which is completely unacceptable and to create a new communication. It is contemplated that a penalty clause can be negotiated as part of the warranty agreement negotiations whereby the participants agree to a penalty that is incurred should a participant wish to renegotiate the communication after a failure.

If a renegotiation has occurred, the process can recommence at step 64, after payment of any such penalty and/or enforcement of the warranty mechanism of step 74.

Finally, at step 74, the trusted party enforces the agreed warranty, most often by compensating, in an agreed manner, the entity paying for the communication. If a penalty clause has been negotiated, this too is enforced. As described above, multiple entities can have an interest in the communication and can be using shared billing, so it can be appropriate and/or necessary to compensate multiple participants.

As will be apparent to those of skill in the art, specific steps 70, 72 and 74 are not essential and are merely preferred aspects of an embodiment of the invention. All that is required for the present invention is that, upon detection of a failure under the warranty terms, steps that are agreeable to the participants are performed to compensate, in some form, for the failure to meet the agreed communication parameters. Thus, for example, step 72 may be omitted altogether if the entities have agree that the communication cannot be renegotiated. Alternative and/or additional steps to steps 70, 72 and 74 can also be performed within the scope of the invention as will be apparent to those of skill in the art.

Compensation can apply to the current communication (an immediate reduction in the cost for the communication, etc.), or to future communications (a credit to be applied to an entity's account) effected by the entities. The form of compensation is not particularly limited, but could include: a financial warranty, such as reduced rate for the communication or reduced billable duration for the communication. For example, the calling party may negotiate a required voice quality of greater than MOS (mean opinion score) 3.5 for which the compensation for a failure would be a refund of charges for the last five minutes of the communication; or a product warranty, such as allowing the calling party to extend the call at no additional cost, giving free time, or a free quantity of data or frames on an agreed basis, such as ten free frames for every dropped frame.

The present invention can be employed to warrant an end to end communication (i.e. between two end users) or to warrant one or more point to point links in an end to end communication, as desired.

While it is currently preferred that the present invention be employed with a network wherein parameters for communications are negotiated, it is also contemplated that the present invention can be employed to allow existing PSTN service providers the option of using connectionless networks for their PSTN calls. In such a circumstance, the PSTN service provider can offer its clients a predetermined warranty agreement for the communications which it establishes over these networks. As described above, when performance is not met, the user receives a predefined compensation under the warranty. This would allow existing PSTN service providers to improve their efficiency by using other networks, without requiring reservation of resources or extensive over-provisioning of network capacity. Also, a selection of such a warranted service or conventional service can be offered to the end user when they establish their connection. This would allow, for example, business calls to be completed via the conventional PSTN network and personal calls to be completed via the warranted network. Such a selection can be effected by a dialing prefix, interactive voice response (IVR) or by any other suitable mechanism as will occur to those of skill in the art.

Further, depending upon the warranty terms and the cost that can be charged for a communication, a service provider can select between establishing a communication based on a connectionless network or other networks, such as those employing call-admission systems, RSVP protocols, etc. In this manner a service provider can provide a range of alternative communication structures as makes economic sense for a particular communication.

It is also contemplated that a communication can be established with one or more links provided on call-admission, or PSTN network, and a connectionless link. In such a case, warranties are implemented on the appropriate links (i.e.—the non call admission or PSTN links).

As described above, the present invention provides a novel telecommunication system and method for communicating between at least two end users, as represented by user interfaces, over at least one link which is provided by a telecommunication network. Preferably, the communication is defined by a set of parameters, usually including one or more network performance and/or QoS parameters, which are negotiated by, or on behalf of, at least one of the users with the one or more network service providers who will establish the communication. A successful negotiation includes defining a set of values for the parameters and a warranty agreement with the network service provider or providers defining at least one of the agreed values for the parameter to be warranted and a compensation method to be applied should a measured value of the parameter fail to meet the corresponding agreed value.

Once the communication is established, the agreed warranted parameter, or parameters, is monitored and, in the event of a failure of the monitored parameter to meet the agreed values, the compensation method is invoked and at least one user or other entity is compensated in accordance with the compensation method. If multiple users are involved in a communication, the compensation can be divided amongst them according to an agreed scheme. Similarly, if multiple network service providers are involved in the communication with the users and/or establishing point to point links in the communication, the network service provider who fails to meet agreed parameters can compensate other network service providers and/or users, as appropriate. Compensation can be by monetary means, including reduced billings, refunds and/or penalty payments, or by the provision of free or reduced rate communications, either for the present communication or for a future communication.

As is also mentioned above, parameters to be warranted can be quite broad and can include service (or content) parameters to warrant such things as no telemarketing calls, etc. In the case of telemarketing, or similarly annoying calls, the warranty mechanism cannot warrant that such calls will not occur, but can compensate the end user for the annoyance when they are experienced. With such a communication, a telemarketer is accepting the risk that the cost of the warranty compensation will be avoided by end users not activating the warranty mechanism (which could be a simple Flash and press of a dial pad button, i.e.—flash and 0) or is acceptable, given a level of success in the marketing effort over several end users.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of establishing and maintaining communication between at least first, second and third entities over a telecommunication network, where said communication is defined by a set of parameters, said method comprising the steps of:

(i) negotiating between at least two of said first, second and third entities an agreed set of values for said parameters that define the desired communication;

(ii) negotiating a warranty agreement between at least said two of said first, second and third entities defining: at least one of said agreed parameters to be monitored; at least one entity to perform said monitoring; and a compensation method to be applied should said at least one monitored parameter fail to meet the corresponding one of said agreed values;

(iii) establishing said communication;

(iv) monitoring said at least one monitored parameter of said communication by said at least one entity performing said monitoring; and (v) in the event of a failure of said at least one monitored parameter to meet said agreed value, the entities responsible for said failure compensating at least one of the other of said entities in accordance with said negotiated compensation method.

2. The method as claimed in claim 1, wherein said warranty agreement further defines a penalty clause allowing an entity responsible for said monitored parameter and failing to meet said agreed value to renegotiate said communication by negotiating a new set of parameters and providing a penalty compensation, defined in said warranty agreement, to at least one other of said at least three entities.

3. The method as claimed in claim 1, wherein step (iv) is performed by another entity trusted by each of said at least three entities.

4. The method as claimed in claim 1, wherein said compensation is a monetary compensation.

5. The method as claimed in claim 1, wherein said compensation is by the provision of a reduced cost for said communication.

6. The method as claimed in claim 1, wherein said compensation is by the provision of a reduced cost for a future communication between said at least two of said at least three entities.

7. The method as claimed in claim 1, wherein said compensation is by the provision of an agreed amount of data transfer through said communication at no cost to said compensated entity.

8. The method as claimed in claim 1, wherein said at least one parameter of said communication which is monitored is the latency of said communication between at least two entities involved in said communication.

9. The method as claimed in claim 1, wherein said at least one parameter of said communication which is monitored is an error rate experienced during said communication between at least two entities involved in said communication.

10. The method as claimed in claim 1 wherein said at least one parameter that is monitored is the type of communication and one of said at least three entities performs said monitoring.

11. The method as claimed in claim 1 wherein said at least one parameter that is monitored is the identity of the entity receiving the communication.

12. The method as claimed in claim 1 wherein said at least one parameter is conditional on another parameter of said communication.

13. The method as claimed in claim 1 wherein the amount of compensation paid in step (iv) is graduated and dependent upon the degree to which said at least one monitored parameter is not met.

14. The method as claimed in claim 1, wherein one of the at least two warranties relates to a different warranted parameter than the other of said at least two warranties.

15. A telecommunications system comprising:

a first end user entity;

a second end user entity;

a telecommunications network entity comprising at least part of an interconnection between said first end user entity and said second end user entity and having at least one transmission link;

at least said first end user entity, said telecommunication network entity and said second end user entity negotiating a communication between said first end user entity and said second end user entity; and said entities being operable to:
  (a) agree on.values for a set of parameters defining a communication and implement said communication between said first end user entity and said second end user entity over said telecommunication network entity; and
  (b) agree on a warranty agreement defining at least one of said set of parameters to be monitored by an entity and a compensation method to be applied should said at least one monitored parameter fail to meet the corresponding one of said agreed values and implement said warranty agreement, the compensation method including determining the entity responsible for the failure and the entity to receive the compensation.

16. The telecommunications system as claimed in claim 15 wherein the compensation method includes paying a monetary compensation to the entity defined to receive compensation.

17. The telecommunications system as claimed in claim 15 wherein another entity, trusted by said first end user entity, second end user entity and said telecommunication network entity, monitors said communication to ensure said monitored parameter is met.

18. The telecommunications system as claimed in claim 15, further comprising at least two telecommunication network entities; each telecommunication network entity having at least one telecommunication link and said links serving to interconnect said first end user entity and second end user entity.

* * * * *

UNITED STATES PATENT AND TRADEMARK OFFICE
CERTIFICATE OF CORRECTION

PATENT NO. : 6,535,592 B1
DATED : March 18, 2003
INVENTOR(S) : Snelgrove

It is certified that error appears in the above-identified patent and that said Letters Patent is hereby corrected as shown below:

Column 12,
Lines 39-63, Claim 1 should read as follows:

--A method of establishing and maintaining communication between at least first, second and third entities over a telecommunication network, where said communication is defined by a set of parameters, said method comprising the steps of:
 (i) negotiating between said first, second and third entities an agreed set of values for said parameters that define the desired communication;
 (ii) negotiating a first warranty agreement between two of said first, second and third entities and a second warranty agreement between a different two of said first, second and third entities, each warranty agreement defining: at least one of said agreed parameters to be monitored; at least one entity to perform said monitoring; and a compensation method to be applied should said at least one monitored parameter fail to meet the corresponding one of said agreed values;
 (iii) establishing said communication;
 (iv) monitoring said at least one monitored parameter of said communication by said at least one entity performing said monitoring; and
 (v) in the event of a failure of said at least one monitored parameter to meet said agreed value, the entities responsible for said failure compensating at least one of the other of said entities in accordance with said negotiated compensation method.--

Column 12, line 64 - Column 3, line 3,
Claim 2 should read as follows:

--The method as claimed in claim 1, wherein at least one of said first and second warranty agreements further defines a penalty clause allowing an entity responsible for said monitored parameter and failing to meet said agreed value to renegotiate said communication by negotiating a new set of parameters and providing a penalty compensation, defined in said warranty agreement, to at least one other of said at least three entities.--

Column 14,
Lines 1-28, Claim 15 should read as follows:

A telecommunications system comprising:
 a first end user entity;
 a second end user entity;
 a telecommunications network entity comprising at least part of an interconnection between said first end user entity and said second end user entity and having at least one transmission link;
 at least said first end user entity, said telecommunication network entity and said second end user entity negotiating a communication between said first end user entity and said second end user entity; and
 said entities being operable to:
 (a) agree on values for a set of parameters defining a communication and implement said communication between said first end user entity and said second end user entity over said telecommunication network entity; and
 (b) agree on at least two warranty agreements, each warranty agreement being agreed between a different two of said first end user entity, second end user entity and said telecommunications network entity and defining at least one of said set of parameters to be monitored by one of said entities and a compensation method to be applied should said at least one monitored parameter fail to meet the corresponding one of said agreed values and implement said warranty agreement, the compensation method including determining the entity responsible for the failure and the entity to receive the compensation.

UNITED STATES PATENT AND TRADEMARK OFFICE
CERTIFICATE OF CORRECTION

PATENT NO. : 6,535,592 B1
DATED : March 18, 2003
INVENTOR(S) : Snelgrove

It is certified that error appears in the above-identified patent and that said Letters Patent is hereby corrected as shown below:

Column 14 (cont'd),
Line 44, add Claims 19 and 20, as follows:

--The method as claimed in claim 1 wherein one of said first and second warranty agreements relates to a different warranted parameter than the other of said first and second warranty agreements.--

The telecommunications system as claimed in Claim 15, further comprising at least two telecommunications network entities; each telecommunication network entity having at least one telecommunication link and said links serving to interconnect said first end user entity and second end user entity.

Signed and Sealed this

Twenty-first Day of December, 2004

JON W. DUDAS
*Director of the United States Patent and Trademark Office*